(12) United States Patent
Saitou

(10) Patent No.: US 7,323,251 B2
(45) Date of Patent: Jan. 29, 2008

(54) DECORATING SHEET, DECORATED RESIN MOLDED ARTICLE AND METHOD FOR PRODUCTION THEREOF

(75) Inventor: Nobuo Saitou, Saitama (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 10/581,026

(22) PCT Filed: Nov. 25, 2004

(86) PCT No.: PCT/JP2004/017493

§ 371 (c)(1),
(2), (4) Date: Apr. 11, 2007

(87) PCT Pub. No.: WO2005/051660

PCT Pub. Date: Jun. 9, 2005

(65) Prior Publication Data

US 2007/0224433 A1   Sep. 27, 2007

(30) Foreign Application Priority Data

Nov. 28, 2003 (JP) .............................. 2003-400527

(51) Int. Cl.
*B32B 27/06* (2006.01)
*B32B 27/36* (2006.01)
*B32B 37/00* (2006.01)
*B32B 37/10* (2006.01)
*B29C 63/02* (2006.01)

(52) U.S. Cl. .................. 428/480; 428/195.1; 264/510; 264/511; 264/512; 264/513; 264/544; 264/550; 264/239; 264/241; 264/271.1; 264/328.1; 264/330; 264/331.11; 264/337; 264/338; 156/221; 156/230; 156/242; 156/245; 156/246; 156/247; 156/308.2; 156/309.6; 156/309.9; 156/344

(58) Field of Classification Search ...................... None
See application file for complete search history.

(56) References Cited

U.S. PATENT DOCUMENTS

| 4,213,926 | A | * | 7/1980 | Toyoda et al. ................ 264/74 |
| 4,643,789 | A | * | 2/1987 | Parker et al. ................ 156/219 |
| 4,777,077 | A | * | 10/1988 | Miyazawa et al. .......... 428/200 |
| 5,017,417 | A | * | 5/1991 | Miyazawa et al. ........ 428/195.1 |
| 5,071,690 | A | * | 12/1991 | Fukuda et al. .............. 428/141 |
| 5,405,681 | A | * | 4/1995 | Nakayama et al. ......... 428/215 |
| 5,443,765 | A | * | 8/1995 | Yoshimura et al. ......... 264/488 |
| 5,490,893 | A | * | 2/1996 | Enlow et al. ................ 156/230 |
| 5,707,697 | A | * | 1/1998 | Spain et al. .................. 428/31 |

(Continued)

FOREIGN PATENT DOCUMENTS

EP         1 688 248      * 8/2006

(Continued)

*Primary Examiner*—Vivian Chen
(74) *Attorney, Agent, or Firm*—Antonelli, Terry, Stout & Kraus, LLP.

(57) ABSTRACT

The present invention provides a decorative sheet having a base film made of a thermoplastic polyester resin and a decorative layer on the base film, and provides a decorated resin molding produced by using the decorative sheet. The base film is not broken in both of MD (a flow direction of film-forming) and TD (a direction perpendicular to MD) and has a stress of 20 N/cm$^2$ or less in any of MD and TD under a 200% elongation at 80° C. The decorated resin molding includes a resin molding and the decorative sheet which is unitedly laminated to the resin molding. The decorative layer of the decorative sheet faces toward the resin molding. The decorative sheet is suitable for producing the decorated resin molding by a decorating injection molding method.

9 Claims, 2 Drawing Sheets

U.S. PATENT DOCUMENTS

| | | | | |
|---|---|---|---|---|
| 5,730,825 A | * | 3/1998 | Atake | 156/246 |
| 5,750,234 A | * | 5/1998 | Johnson et al. | 428/141 |
| 5,759,684 A | * | 6/1998 | Atake | 428/32.63 |
| 5,919,537 A | * | 7/1999 | Niazy | 428/40.1 |
| 6,245,182 B1 | * | 6/2001 | Nakamura | 156/230 |
| 6,527,898 B1 | * | 3/2003 | Nakamura | 156/230 |
| 7,070,849 B2 | * | 7/2006 | Mori et al. | 428/141 |
| 7,074,477 B2 | * | 7/2006 | Ast | 428/195.1 |

FOREIGN PATENT DOCUMENTS

| | | | |
|---|---|---|---|
| JP | 64-045699 | * | 2/1989 |
| JP | 02-014111 | * | 1/1990 |
| JP | 03-288699 | * | 12/1991 |
| JP | 2002-337225 | * | 11/2002 |
| JP | 2004-010711 | * | 1/2004 |

* cited by examiner (a)

(b)

DECORATING SHEET, DECORATED RESIN MOLDED ARTICLE AND METHOD FOR PRODUCTION THEREOF

TECHNICAL FIELD

The present invention relates to decorative sheets, decorated resin moldings, and a production method thereof, more particularly, relates to decorative sheets suitable for producing decorated resin moldings by a decorating injection molding method, decorated resin moldings (lamination moldings or transfer moldings) produced using the decorative sheets, and a process for efficiently producing the decorated resin moldings.

BACKGROUND ART

The decorating injection molding method has been widely used to decorate resin moldings having a complicated surface such as a three-dimensional curved surface (for example, Patent Documents 1 and 2). The decorating injection molding is a method of decorating the surface of resin moldings by injection molding, in which a decorative sheet having been placed in a mold is united with a molten resin injected into the mold cavity, and is roughly classified into a laminate decoration method and a transfer decoration method according to the difference in the constructions of the decorative sheet to be united with the resin moldings.

In the laminate decoration method, whole layers of a decorative sheet having a base film and a decorative layer formed thereon are unitedly laminated to the surface of resin moldings, while using a decorative laminate sheet as the decorative sheet. In the transfer decoration method, a similar decorative sheet is unitedly laminated to the surface of resin moldings and then only the base film is released with the transfer layer such as a decorative layer being remained on the resin moldings, while using a transfer sheet as the decorative sheet.

An example of the decorating injection molding method, in which a transfer sheet is used as the decorative sheet, is described below with reference to the attached FIGS. 4 and 5. FIGS. 4 and 5 illustrate an example of the molding steps of a decorating injection molding method, in which a decorating injection molding machine 60 has a female mold 70 and a male mold 80 which is disposed oppositely to the female mold 70 at its side. The female mold 70 has a cavity 72 corresponding to the contour of moldings to be produced. Suction holes 74 extending throughout the female mold 70 are further provided so as to open to the cavity 72. The female mold 70 is made reciprocally movable in the directions approaching to and coming apart from the male mold 80 by a reciprocating means 75 such as a cylinder. The male mold 80 has a core 82 which is inserted into the cavity 72 and a gate 84 for injecting a molten resin. Between the female mold 70 and the male mold 80, a reciprocally movable heating plate 90 is optionally disposed, if necessary.

To conduct the decoration simultaneously with the injection molding by the use of the machine 60, a decorative sheet 100 is first disposed oppositely to the female mold 70 at its side. After optionally softening the decorative sheet 100 at appropriate temperatures by the heating plate 90, the opening of the cavity 72 is closed by the decorative sheet 100 which is held between the female mold 70 and the heating plate 90. Then, the cavity 72 is evacuated through the suction holes 74 formed in the female mold 70, while simultaneously supplying a pressurized air, if necessary, onto the decorative sheet 100 through a vent hole formed in the heating plate 90. Both the molds are heated generally at 30 to 50° C.

By such an operation, the decorative sheet 100 is drawn along the inner surface of the cavity 72 and then closely adhered to the cavity 72, as shown in FIG. 4. This step is generally called as a preforming process, in which a softened sheet is usually drawn about 200% at highest. Next, the heating plate 90 is withdrawn and the female mold 70 is allowed to move forward so as to put it together with the male mold 80 as shown in FIG. 5. After clamping the molds, a cavity formed between the female mold 70 and the male mold 80 is filled with a fluidized resin molding compound P by injecting it through the gate 84 formed in the male mold 80, to perform the injection molding.

By such an injection molding, the decorative sheet 100 placed in the female mold 70 and the injected resin are unitedly bonded, and a molding having its outer surface coated with the decorative sheet 100 is obtained by the mold break after the completion of the injection molding. In the subsequent step, only the base film is peeled off from the decorative sheet 100 united to the outer surface of the molding to leave a transfer layer such as a decorative layer on the molding, thereby completing the decoration.

In the decorating injection molding method described above, it is important for producing good moldings that the decorative sheet 100 is stretched along the inner surface of the cavity 72 and then closely adhered to the cavity 72 during the preforming process or the injection of molten resin (moldability), without an unfavorable deformation due to excessive drawing exceeding the extent necessary for allowing the decorative sheet to match the shape of the mold, which can be caused by the action of vacuum and pressure, the pressure of molten resin or the drawing due to shearing stress. This is also true in the case of using a laminate sheet as the decorative sheet, and particularly important in the molding using a deep mold because the decorative sheet is subject to deep drawing.

If the depth of draw forming is large (the stretch ratio of decorative sheet is large), it is required for such a decoration of injection molded articles to decorate the decorative sheet until it reaches the drawn shape corresponding to a draw ratio of 180 to 200% at highest. To meet this requirement, polyvinyl chloride (PVC), acrylonitrile-butadiene-styrene copolymer resin (ABS resin), etc. have been used for the base film of the transfer sheet and laminate sheet because of their good thermoformability. However, the decorative sheet having a base film made of such a resin may be, particularly when subjected to a deep drawing, excessively deformed, fluidized or broken during the vacuum-pressure forming in the preforming process and also by the heat and pressure of the injected molten resin in the injection molding. In addition, the film around the gate for resin injection is drawn by the injected resin, thereby likely to cause the drawn film to bite into the resin molding. Further, such a decorative sheet is poor in the transparency, surface smoothness, coating appearance, etc. Particularly in the case of the decorative sheet having a PVC film, the adhesive strength between the resin molding and the decorative sheet is liable to decrease with time because of the migration of plasticizer.

To remove these problems, there has been disclosed a decorated molding in which the base film of decorative sheet is mainly made of a methyl acrylate-butyl acrylate copolymer, a methyl acrylate-butyl methacrylate copolymer, a methyl methacrylate-butyl acrylate copolymer or a methyl methacrylate-butyl methacrylate copolymer (for example, Patent Document 3). It is further disclosed that a film having a thickness of 50 to 260 µm and a stress at 200% elongation of 20 to 70 kgf/cm² (196 to 686 N/cm²) at 100° C. is preferable as the base film for the decorative sheet. However, the proposed technique relates to a decorative sheet having a base film made of a (meth)acrylic copolymer. If such a decorative sheet is used as the transfer sheet, the base film is hardly peeled off (defective transfer), because the adhesion between the base film and the transfer layer (decorative layer) made of a printing ink layer is excessively high. If used as the laminate sheet, the resistance to peel-off is in turn advantageous, but, the base film is insufficient in solvent resistance and stain resistance which are required for the surface protective layer.

[Patent Document 1] JP 50-19132B
[Patent Document 2] JP 61-17255B
[Patent Document 3] JP 8-276544A

DISCLOSURE OF INVENTION

In view of the above circumstances, an object of the present invention is to provide a decorative sheet which is suitable for producing decorated resin moldings by the decorating injection molding method, more specifically, a decorative sheet which can easily follow the inner surface of the mold in the preforming process and which is resistant to wrinkle, blister and rapture when united with a resin molding by lamination in the injection molding. Another object is to provide a decorated resin molding (lamination molding or transfer molding) produced by using such a decorative sheet. Still another object is to provide a method for efficiently producing such a decorated resin molding.

As a result of intensive research in view of achieving the above objects, the inventor has found that a decorative sheet having a base film made of a thermoplastic polyester resin having specific properties, particularly made of a polyethylene terephthalate-based resin, meets the above objects. It has been also found that a decorated resin molding (lamination molding or transfer molding) with a good quality can be easily produced by uniting the decorative sheet onto a resin molding by lamination. It has been further found that such a decorated resin molding can be efficiently produced through specific production steps. The present invention is based on these findings.

Thus, the present invention provides:

(1) a decorative sheet including a base film made of a thermoplastic polyester resin and a decorative layer on the base film, the base film being not broken in both of MD (a flow direction of film-forming) and TD (a direction perpendicular to MD) and having a stress of 20 N/cm² or less in any of MD and TD, each under a 200% elongation at 80° C.;

(2) the decorative sheet of Item 1, wherein the thermoplastic polyester resin is a polyethylene terephthalate-based resin;

(3) the decorative sheet of Item 1 or 2, for use in the production of decorated resin moldings by a decorating injection molding method;

(4) a decorated resin molding including a resin molding and the decorative sheet as defined in any of Items 1, 2 and 3 which is united with the resin molding by lamination such that the decorative layer of the decorative sheet faces toward the resin molding;

(5) a decorated resin molding including a resin molding and a decorative layer bonded to the resin molding, the decorative layer being formed from the decorative sheet as defined in any of Items 1, 2 and 3 by removing the base film;

(6) a method of producing a decorated resin molding, which includes the following sequential steps:
(A) a step of preforming a decorative sheet by disposing the decorative sheet as defined in any of Items 1, 2 and 3 so as to allow the base film of the decorative sheet to face toward a mold surface having a given shape in a movable mold, and then, softening the decorative sheet by heating while bringing the softened decorative sheet into close contact with the mold surface by vacuum suction from a side of the movable mold;
(B) a step of injection molding by clamping the movable mold holding the decorative sheet which is brought into contact with the mold surface and a stationary mold, injecting a fluidized resin molding compound to fill a cavity formed between the molds, and then solidifying the fluidized resin molding compound thus injected, thereby forming a resin molding united with the decorative sheet by lamination, and
(C) a step of taking the resin molding laminated with the decorative sheet with its entire layers out of the molds after separating the movable mold from the stationary mold;

(7) a method of producing a decorated resin molding, which includes the following sequential steps:
(A) a step of preforming a decorative sheet by disposing the decorative sheet as defined in any of Items 1, 2 and 3 so as to allow the base film of the decorative sheet to face toward a mold surface having a given shape in a movable mold, and then, softening the decorative sheet by heating while bringing the softened decorative sheet into close contact with the mold surface by vacuum suction from a side of the movable mold;
(B) a step of injection molding by clamping the movable mold holding the decorative sheet which is brought into contact with the mold surface and a stationary mold, injecting a fluidized resin molding compound to fill a cavity formed between the molds, and then solidifying the fluidized resin molding compound thus injected, thereby forming a resin molding united with the decorative sheet by lamination, and
(C') a step of separating the movable mold from the stationary mold, and taking the resin molding laminated with the decorative sheet out of the molds while leaving the base film of the decorative sheet in the movable mold, or taking the resin molding laminated with the decorative sheet with its entire layers out of the molds and then peeling off the base film from the decorative sheet; and (8) the method of Item 6 or 7, wherein the movable mold and the stationary mold constitute male and female matching molds.

Since the base film made of a thermoplastic polyester resin film has specific properties, the present invention provides a decorative sheet suitable for producing decorated resin moldings by the decorating injection molding method, which decorative sheet can easily follow the mold surface in the preforming process and is resistant to wrinkle, blister and rapture when united with a resin molding by lamination in the injection molding.

By using such a decorative sheet in the decorating injection molding method, a decorated resin molding (lamination molding or transfer molding) with a good quality can be produced. Namely, by selecting the thermoplastic polyester resin as the material for the base film, the resultant base film, as compared with a base film made of a (meth)acrylic copolymer, exhibits a good peeling ability (transfer ability) against a transfer layer when the decorative sheet is used as a transfer sheet and a good solvent resistance and stain resistance when the decorative sheet is used as a laminate sheet.

REFERENCE NUMERALS OF DRAWINGS

Figure 1:
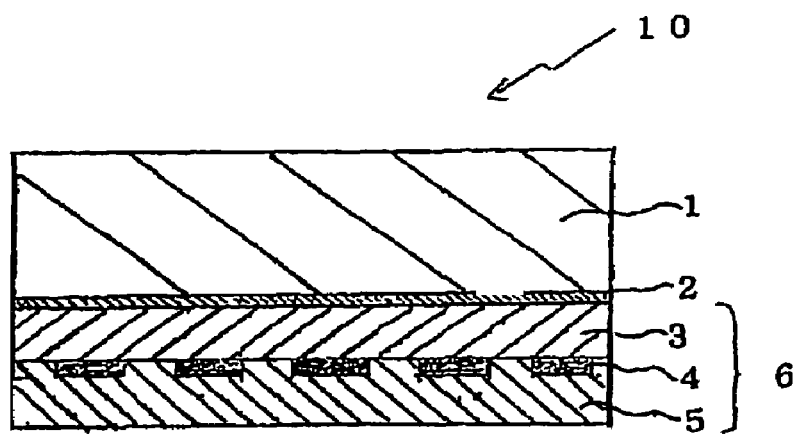
FIG. 1 is a cross-sectional view showing an example of the structure of decorative sheet of the present invention.

1: base film
2: release layer
3: peel layer
4: decorative layer
5: adhesive layer
6: transfer layer
7: resin molding
10,100: decorative sheet
20: decorated resin molding
60: decorating injection molding machine
70: female mold
72: cavity
74: suction hole
75: reciprocating means
80: male mold
82: core
84: gate
90: heating plate
P: resin molding compound

BEST MODE FOR CARRYING OUT THE INVENTION

The decorative sheet of the present invention has a decorative layer on a base film made of a thermoplastic polyester resin. Such a decorative sheet is suitable for the production of decorated resin moldings by the decorating injection molding method which will be described below, because of its good transfer ability when used as the transfer sheet and its surface having a good solvent resistance and stain resistance when used as a laminate sheet.

Decorative sheets for the production of resin moldings by the decorating injection molding method are required to easily follow the mold surface in the preforming process and to be resistant to wrinkle, blister and rapture when united with resin moldings by lamination in the injection molding.

In the decoration of injection molded resin articles, the decorative sheet is drawn at a ratio of about 180 to 200% at its maximum. In the present invention, since the decorative sheet is exposed to temperatures of about 70 to 80° C. in the course from the preforming step to the injection molding step, to meet the above requirements for the decorative sheet, the base film of the decorative sheet is required not to be broken in both of MD (a flow direction of film-forming) and TD (a direction perpendicular to MD) and have a stress of 20 N/cm$^2$ or less, preferably 15 N/cm$^2$ or less, and more preferably 10 N/cm$^2$ or less in any of MD and TD, each under a 200% elongation at 80° C.

The base film meeting such requirements has a good moldability and makes the decorative sheet fully satisfactory for the above requirements. However, if the moldability is excessively high, the base film expands or contracts in a later step such as a heat dry step after a printing step, to cause drawbacks such as deformation of the decorative sheet and misregister in multicolor printing. Therefore, the lower limit of the stress is preferably about 5 N/cm$^2$ in any of MD and TD under a 200% elongation at 80° C.

The stress in each of MD and TD at a 200% elongation is measured under the following conditions:

Thickness of test piece: thickness actually laminated to a decorative sheet;
Width of test piece: 10 mm (dumbbell test piece)
Tensile speed (rate of strain): 500 mm/min
Distance between chucks: 50 mm The thickness of base film is generally about 20 to 500 μm for the laminate sheet use and about 20 to 150 μm for the transfer sheet use, although not particularly limited thereto.

As the thermoplastic polyester resin for constituting the base film, a polyethylene terephthalate-based resin is preferably used in the present invention because of its excellent mechanical properties such as transparency and rigidity, easiness of controlling the crystallinity (glass transition temperature) by modification or stretching, and good economy.

The polyethylene terephthalate-based resin is not limited in its kind as far as it provides the base film having the above properties, and may be used alone or in combination of two or more. Since polyethylene terephthalate (PET) is generally highly crystalline and has a glass transition temperature of about 81° C., the use of at least one kind of modified polyethylene terephthalate having a controlled crystallinity is preferred.

Examples of such a modified polyethylene terephthalate include dicarboxylic acid-modified polyethylene terephthalates, glycol-modified polyethylene terephthalates and dicarboxylic acid/glycol-modified polyethylene terephthalates.

The dicarboxylic acid-modified polyethylene terephthalate is a modified product of polyethylene terephthalate obtained by replacing a part of its terephthalic acid constitutional unit with another dicarboxylic acid unit. Examples of the dicarboxylic acids for another dicarboxylic acid unit include aromatic dicarboxylic acids such as isophthalic acid, naphthalenedicarboxylic acid, diphenyl sulfone dicarboxylic acid, diphenyldicarboxylic acid, diphenyl ether dicarboxylic acid, and diphenyl ketone dicarboxylic acid; alicyclic dicarboxylic acids such as 1,4-cyclohexanedicarboxylic acid; and aliphatic dicarboxylic acids such as adipic acid, azelaic acid, dimer acid and hydrogenated dimer acid. These dicarboxylic acids other than terephthalic acid may be used alone or in combination of two or more.

The ratio of the terephthalic acid unit and another dicarboxylic acid unit each forming the dicarboxylic acid constitutional units of the dicarboxylic acid-modified polyethylene terephthalate is not particularly limited and usually 25:75 to 99:1 by mol, preferably 60:40 to 90:10 by mol. The isophthalic acid-modified polyethylene terephthalate is preferably used as the dicarboxylic acid-modified polyethylene terephthalate.

The glycol-modified polyethylene terephthalate is a modified product of polyethylene terephthalate obtained by replacing a part of its ethylene glycol constitutional unit with another glycol unit. Examples of the glycols for another glycol unit include alicyclic diols such as 1,4-cyclohexanedimethanol, 1,3-cyclohexanedimethanol, 1,4-cyclohexanediol, 1,3-cyclohexanediol, norbornenedimethanol, and tricyclodecanedimethanol; aliphatic diols such as neopentyl glycol, 1,3-propanediol, 1,4-butanediol, 1,5-pentanediol, 1,6-hexanediol, 1,7-heptanediol, 1,8-octanediol, 1,9-nonanediol, 1,10-decanediol, polyethylene glycol, and polytetramethylene glycol; and aromatic diols such as ethylene oxide adduct of 2,2-bis(4-hydroxyphenyl)propane, ethylene oxide adduct of 4,4'-dihydroxydiphenyl sulfone and ethylene oxide adduct of 1,4-dihydroxybenzene. These glycols other than ethylene glycol may be used alone or in combination of two or more.

The ratio of the ethylene glycol unit and another glycol unit each forming the glycol constitutional units of the glycol-modified polyethylene terephthalate is not particularly limited and usually 50:50 to 99:1 by mol, and preferably 60:40 to 90:10 by mol. The 1,4-cyclohexanedimethanol-modified polyethylene terephthalate is preferably used as the glycol-modified polyethylene terephthalate, which is commercially available under the tradename "KODAR PETG" from Eastman Chemical Company.

The dicarboxylic acid/glycol-modified polyethylene terephthalate is a modified product of polyethylene terephthalate obtained by replacing a part of its terephthalic acid constitutional unit with another dicarboxylic acid unit and a part of its ethylene glycol constitutional unit with another glycol unit. The dicarboxylic acids exemplified above with respect to the dicarboxylic acid-modified polyethylene terephthalate may be used as the dicarboxylic acid for another dicarboxylic acid unit. Those dicarboxylic acids other than terephthalic acid may be used alone or in combination of two or more.

The glycols exemplified above with respect to the glycol-modified polyethylene terephthalate may be used as the glycol for another glycol unit. Those glycols other than ethylene glycol may be used alone or in combination of two or more.

The ratio of the terephthalic acid unit and another dicarboxylic acid unit each forming the dicarboxylic acid constitutional units of the dicarboxylic acid/glycol-modified polyethylene terephthalate is not particularly limited and usually 25:75 to 99:1 by mol, and preferably 60:40 to 90:10. The ratio of the ethylene glycol unit and another glycol unit each forming the glycol constitutional units is not particularly limited and usually 50:50 to 99:1, and preferably 60:40 to 90:10.

The base film of the decorative sheet of the invention is preferably made of a polyethylene terephthalate-based resin containing at lease one kind of the modified polyethylene terephthalate mentioned above. If the base film made of only one kind of the modified polyethylene terephthalate has properties meeting the above requirements, the base film may be made of such a modified polyethylene terephthalate alone. Alternatively, a combination of two or more kinds of the modified polyethylene terephthalate or a combination of a general-purpose highly crystalline polyethylene terephthalate with at lease one kind of the modified polyethylene terephthalate may be utilized.

The polyethylene terephthalate-based resin used as the material for the base film may contain, if needed, another thermoplastic resin in an amount not adversely affecting the objects of the present invention. Examples of another thermoplastic resin include other polyester resins such as polybutylene terephthalate and polyethylene naphthalate; polyolefin resins such as polyethylene and polypropylene; vinyl resins such as polyvinyl chloride, polyvinylidene chloride, polyvinyl alcohol and ethylene-vinyl acetate copolymer; and acrylic resins such as (meth)acrylate copolymer, for example, polymethyl methacrylate, although not limited thereto.

In view of the vacuum forming ability of the decorative sheet in the preforming step, the glass transition temperature of the polyethylene terephthalate-based resin for the base film of the decorative sheet is preferably in the range of about 30 to 70° C.

The base film is produced by forming a resin composition containing the polyethylene terephthalate-base resin into a film, which is then optionally monoaxially or biaxially stretched, preferably biaxially stretched, if necessary. The stretch ratio for the biaxial stretching is generally about 1.2 to 2.0 in both MD and TD.

When the decorative sheet is intended to be used as the laminate sheet, the resin composition may contain, if necessary, additives such as antioxidant, ultraviolet absorber, light stabilizer, anti-friction agent, lubricant, plasticizer, antistatic agent, flame retardant, colorant, anti-fungus agent, and antibacterial agent. These additives are suitably selected from known products according to the end use of the decorated resin molding of the invention.

If the decorated resin molding is intended to be used, for example, under conditions requiring the weatherability, it is preferred to impart the weatherability to the base film of the decorative sheet for laminate use. In this case, an organic ultraviolet absorber of benzotriazole type, benzophenone type or salicylic acid ester type, an inorganic ultraviolet absorber such as zinc oxide, cerium oxide and titanium oxide in the form of fine particles having an average particle size of about 0.2 μm or less, a hindered amine light stabilizer, etc. are preferably blended into the resin composition for the base film.

The decorative sheet of the invention has a base film and a decorative layer on the base film. The layered structure is not particularly limited and may be suitably selected according to its use as the transfer sheet, the laminate sheet or both. In a typical layered structure for the transfer sheet use, a release layer is formed on one surface of the base film. On the release layer, a transfer layer is formed, which includes a decorative layer which is formed on the release layer via a peel layer for allowing the decorative layer to easily peel from the base film and an adhesive layer which is formed on the decorative layer to improve the adhesion between the resin molding and the decorative sheet. The decorative layer is an essential element of the transfer layer, whereas the peel layer and the adhesive layer may be optionally formed if needed. The release layer may be also omitted when the peeling of the base film from the transfer layer is easy (good transfer ability).

In the layered structure for the laminate sheet use, a decorative layer is formed on one of the surfaces of the base film via an easy adhesive primer layer for enhancing the adhesion between the decorative layer and the base film. The easy adhesive primer layer may be optionally formed if needed. Like the transfer sheet use, an adhesive layer may be optionally formed on the decorative layer if needed. In the laminate sheet use, the base film is not peeled from the molded product. Therefore, unlike the transfer sheet use, the peel layer and the release layer are not required.

Next, the decorative sheet of the invention will be described in detail with reference to the attached drawings. FIG. 1 is a cross-sectional view showing an example of the structure of a decorative sheet 10 of the present invention for the transfer sheet use. In the decorative sheet 10, an optional peel layer 3, an essential decorative layer 4 and an optional adhesive layer 5 are sequentially laminated in this order on a release layer 2 formed on the rear surface of a base film 1. The peel layer 3, the decorative layer 4 and the adhesive layer 5 are united to constitute a transfer layer 6.

The release layer 2 is formed to make the peeling of the base film 1 from the resin molding to which the decorative sheet 10 is united by lamination easy, and removed from the resin molding by peeling together with the base film 1 in the transfer operation. In this point, the release layer 2 is distinguished from the peel layer which remains on the resin molding as a part of the transfer layer. The release layer 2 is formed by a known method, for example, by applying a coating solution containing a releasing substance such as polyethylene wax, silicone resin and melamine resin. The thickness of the release layer 2 is usually about 0.1 to 1 μm. When the base film is peeled off, the release layer 2 is also peeled off while remaining adhered to the base film.

If the decorative layer 4 is formed directly on the base film 1 or on the release layer 2 formed on the base film 1, the peel ability (transfer ability) of the decorative layer may become insufficient in some cases. To enhance the peel ability, the peel layer 3 is formed. The peel layer 3 also acts as a protecting layer for the decorative layer 4 after the base film 1 is peeled off when the decorative sheet 10 is used as the transfer sheet. The peel layer 3 is formed by a known method, for example, by applying a coating solution containing an acrylic resin excellent in transparency, weatherability, scratch resistance, etc. The thickness of the peel layer 3 is usually 1 to 30 μm, and preferably 3 to 20 μm, although not limited thereto.

If the base film 1 is easily peeled from the decorative layer 4, both the release layer 2 and the peel layer 3 can be omitted. If a sufficient peel ability can be attained by forming either the release layer 2 or the peel layer 3, it is sufficient to form one. Although not shown in the drawings, the release layer 2 and the peel layer 3 are not formed in the decorative sheet for the laminate sheet use. If the adhesion between the base film 1 and the decorative layer 4 is insufficient, an easy adhesive primer layer is formed at the position occupied by the layers 2 and 3 in FIG. 1.

The decorative layer 4 provides the surface of resin molding with characters, patterns and symbols, or colors the surface of resin molding. The decorative layer is typically a patterned ink layer. The patterned ink layer may be a patternless, allover solid layer in black or silver metallic color or a single- or multi-colored layer with a pattern such as wood appearance, stone appearance (marble appearance, granite appearance), natural leather appearance, cloth texture and abstract pattern. Also, the patterned ink layer may an allover solid layer in transparent yellow color, an allover solid layer in silver metallic color laminated with a patterned layer, or an allover solid layer in gold color laminated with a patterned layer. The patterned ink layer is composed of at least one layer selected from a pigment ink layer made of a pigment and a resin binder, a glitter pigment layer made of a peal pigment and a resin binder and a dye ink layer made of a dye and a resin binder. The patterned ink layer is formed by a general printing method such as an offset printing method, a gravure printing method, an inkjet printing method and a screen printing method, or a coating method such as a roll coating method and a spray coating method. The thickness of the patterned ink layer is usually 0.1 to 20 μm.

Further, the decorative layer 4 may be composed of a metallic thin-film layer or a combination of a metallic thin-film layer and a printed layer. The metallic thin-film layer is formed by a vacuum deposition method, a sputtering method, an ion plating method or a plating method. A desired metallic thin-film layer is obtained by using a substance suitably selected from metals such as aluminum, nickel, gold, platinum, chromium, iron, copper, tin, indium, silver, titanium, lead and zinc, alloys of these metals and compounds of these metals according to intended metallic luster of color.

The adhesive layer 5 is optionally formed on the rear surface of the decorative sheet to enhance the adhesion between the resin molding (adherend) and the decorative sheet. The adhesive layer 5 is preferably made of a known heat-sensitive adhesive containing at least one thermoplastic resin selected from vinyl acetate resin, vinyl chloride-vinyl acetate copolymer, acrylic resin, thermoplastic polyester resin, polyamide resin, ionomer resin, chlorinated polyolefin resin, thermoplastic polyurethane resin, and rubber-based resin.

The adhesive layer 5 is formed from an adhesive containing the resin mentioned above by a known printing or coating method such as a gravure printing method and a roll coating method. The thickness of the adhesive layer 5 is usually 1 to 50 μm, preferably 5 to 30 μm, although not limited thereto.

When the decorative sheet of the invention is used as the laminate sheet, an easy adhesive primer layer is generally formed on the surface of the base film to enhance the adhesion between the base film and a layer to be formed on the base film, as mentioned above. Alternatively, a physical or chemical surface treatment such as an oxidation treatment and a roughening treatment can be employed to make the adhesion easy. Examples of the oxidation treatment include a corona discharge treatment, a plasma treatment, a chromic acid treatment, a flame treatment, a hot air treatment, and an ozone/ultraviolet ray irradiation, and examples of the roughening treatment include a sandblasting treatment and a solvent treatment, with the corona discharge treatment being preferred because of its good effect and easy operation. A known material such as urethane resin and epoxy resin can be used as the easy adhesive primer.

Next, the decorated resin molding of the invention will be described below.

The decorated resin molding of the invention includes two aspects of embodiments. In a first aspect of embodiment, the decorated resin molding is composed of the resin molding and the decorative sheet of the invention which is united with the resin molding by lamination, with the decorative layer of the decorative sheet being unitedly bonded to the resin molding. In a second aspect of embodiment, the decorated resin molding is composed of the resin molding and a decorative layer remaining after removing the base film from the decorative sheet of the invention which is bonded to the resin molding.

Namely, the decorative sheet is used as the laminate sheet in the first aspect of embodiment and used as the transfer sheet in the second aspect of embodiment.

The resin material for constituting the resin molding of the decorated resin molding of the invention is not specifically limited and may be selected from various types of materials as far as the material is an injection-moldable thermoplastic resin or thermosetting resin (inclusive of two-part curable resins). Examples of such thermoplastic resins include vinyl polymers such as polyvinyl chloride and polyvinylidene chloride; styrene-based resins such as polystyrene, acrylonitrile-styrene copolymer and acrylonitrile-butadiene-styrene copolymer (ABS resin); acrylic resins such as polymethyl(meth)acrylate, polyethyl(meth)acrylate and polyacrylonitrile; polyolefin resins such as polyethylene and polypropylene; polyester resins such as polyethylene terephthalate, ethylene glycol-terephthalic acid-isophthalic acid copolymer and polybutylene terephthalate; and polycarbonate resin. Examples of the thermosetting resins include two-part, reaction-curable urethane resins and epoxy resins. These resins may be used alone or in combination of two or more. If necessary, these resins may be added with an additive such as antioxidant, heat stabilizer, ultraviolet absorber, light stabilizer, flame retardant, plasticizer, filler, lubricant, mold release agent, antistatic agent, and colorant.

The thickness of the resin molding constituting the decorated resin molding is selected according to its final use, and usually 1 to 5 mm, and preferably 2 to 3 mm, although not limited thereto.

Figure 2:
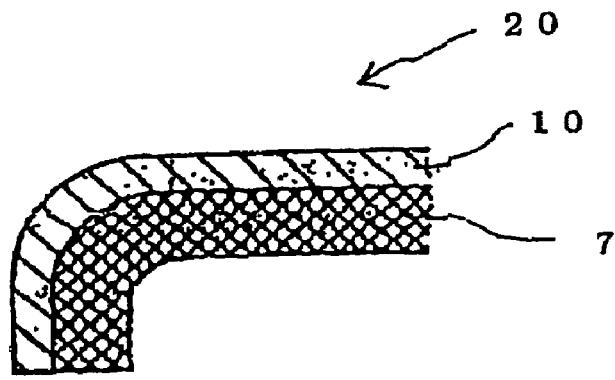
FIG. 2 is a cross-sectional view showing an example of the structure of a part of decorated resin molding of the present invention.

FIG. 2 is a cross-sectional view showing an example of the structure of a part of the decorated resin molding of the present invention. In a decorated resin molding 20, a decorative sheet 10 (laminate sheet) is laminated on a resin molding 7 in its entirety.

Next, the production method of the decorated resin molding of the invention will be described below.

The decorated resin molding is produced by the decorating injection molding method using the decorative sheet of the invention. In the decorating injection molding method, the surface of the resin molding is decorated by placing the decorative sheet in a mold prior to injection molding and then causing the decorative sheet to be united with a fluidized resin which is injected into a cavity.

The decorating injection molding method is roughly classified into a laminate decoration method and a transfer decoration method. In the laminate decoration method, a laminate sheet is used as the decorative sheet, and a decorated resin molding is obtained in which entire layers of the decorative sheet having a base film and a decorative layer thereon are unitedly laminated to the surface of the resin molding. In the transfer decoration method, a transfer sheet is used as the decorative sheet, and a decorated resin molding is obtained in which a decorative layer is laminated on the resin molding as a transfer layer which is formed by peeling off the base film from the decorative sheet unitedly laminated on the surface of the resin molding.

In the decorating injection molding method, the decorative sheet which is to be placed in a mold prior to the injection molding is usually formed into a desired shape such as a solid shape having a three-dimensionally curved surface in the preforming process before the injection molding. In the preforming process, the decorative sheet can be formed into a desired shape by a vacuum forming in an injection mold while utilizing it as a vacuum forming mold. Alternatively, the decorative sheet can be placed into an injection mold after separately formed into a desired shape by a vacuum forming in a different mold. Since the decorative sheet can be united with the resin molding by lamination effectively and precisely, the preforming process utilizing the injection mold also as the vacuum forming mold is preferred. Particularly, according to the production method of the invention described below, desired decorated resin moldings are efficiently produced. The term, vacuum forming, referred to in the present invention includes a vacuum-pressure forming.

The production method of the decorated resin molding of the invention includes two different methods: the lamination method and the transfer method. The lamination method includes the sequential steps: Step A for preforming a decorative sheet, Step B of an injection molding for unitedly laminating a resin molding and the decorative sheet, and Step C for taking out the resin molding laminated with the decorative sheet in its entirety of layers.

The transfer method includes the sequential steps: Step A, Step B each mentioned above and Step C' for taking out the resin molding laminated with the decorative sheet while leaving the base film of the decorative sheet in the mold, or taking out the resin molding laminated with the decorative sheet in its entirety of layers and then peeling off the base film of the decorative sheet.

In the method of the invention, the injection mold may be matching male and female molds composed of a movable female mold having a mold surface with a given shape and a stationary male mold having a projected portion, or a combination of a movable hollow mold having a mold surface with a given shape and a stationary flat mold.

Next, a preferred embodiment of the present invention is specifically described with reference to FIGS. 4 and 5 which show the molding steps using matching male and female molds as the injection mold.

Step A

Step A is a step for preforming a decorative sheet, in which a decorative sheet 100 is first placed in a female mold (movable mold) 70 so as to allow the base film of the decorative sheet 100 to face toward the mold surface with a desired shape of the female mold (movable mold) 70. The decorative sheet 100 is then softened under heating by a heating plate 90. The heating temperature is preferably in the range of around the glass transition temperature or higher but less than the melting temperature (melting point). The heating is more preferably performed at temperatures around the glass transition temperature. The temperatures around the glass transition temperature referred above mean temperatures within the range of the glass transition temperature ±about 5° C., and generally about 70 to 80° C. in the present invention. The heating plate 90 may be known one with any heating manner of radiant heating, conduction heating and induction heating.

The opening of a cavity 72 is closed by the decorative sheet 100 while holding it between the female mold 70 and the heating plate 90. Then, the evacuation for vacuum is conducted through suction holes 74 formed in the female mold 70 while optionally supplying pressurized air through vent holes formed in the heating plate 90. Both the molds are heated generally at about 30 to 50° C.

Figure 4:
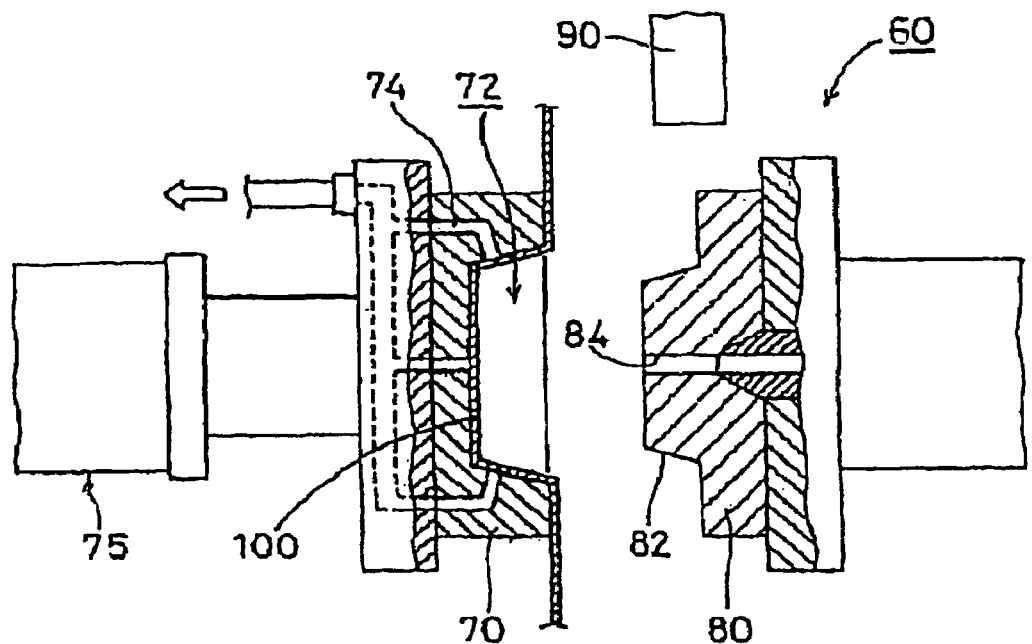
FIG. 4 illustrates a part of the molding steps in an example of the decorating injection molding method.

With these operations, the decorative sheet 100 is drawn along the mold surface of the female mold 70 and closely adheres to the mold surface as shown in FIG. 4, thereby being preformed into a desired shape.

Step B

Step B is an injection molding step, in which the female mold 70 holding the decorative sheet 100 closely adhered to the mold surface is clamped with a male mold (stationary mold) 80. Then, a fluidized resin molding compound is injected into the cavity formed between the molds and solidified to unitedly laminate the decorative sheet 100 to a resin molding being produced. More specifically, after withdrawing the heating plate 90, the female mold 70 is allowed to move toward the male mold 80 as shown in FIG. 5. After clamping the female mold 70 and the male mold 80, the cavity formed between the female mold 70 and the male mold 80 is filled with a fluidized resin molding compound P which is injected through a gate 84 formed in the male mold 80. The resin molding compound P is solidified therein to complete the injection molding. When the resin molding compound P is a thermoplastic resin, it is fluidized by melting under heating and solidified by cooling. When it is a thermosetting resin, a curable liquid composition is used, which is solidified by curing caused by chemical reaction. In this way, the decorative sheet 100 held in the female mold 80 is united with the resin molding being produced.

Steps C and C'

Steps C and C' are steps for taking the resin molding unitedly laminated with the decorative sheet out of the injection mold, with Step C for the lamination method and Step C' for the transfer method.

In Step C, after separating the female mold 70 from the male mold 80, the resin molding laminated with the decorative sheet 100 with its entire layers is taken out. By trimming the excess decorative sheet externally extending beyond the edge of the resin molding, if any, a desired decorated resin molding is obtained. In Step C', after separating the female mold 70 from the male mold 80, the resin molding laminated with the decorative sheet 100 is taken out while leaving the base film of the decorative sheet 100 in the female mold 70 to obtain a desired decorated resin molding. Alternatively, the base film is peeled from the decorative sheet 100 after taking out the resin molding laminated with the decorative sheet 100 with its entire layers, thereby obtaining a desired decorated resin molding.

The production of the decorated resin molding using a combination of a movable hollow mold having a mold surface with a desired shape and a stationary flat mold as the injection mold can be conducted in the same manner as described above. The decorative sheet used in the decorating injection molding method of the invention may be in individual sheet form or in continuous sheet form.

EXAMPLES

The present invention will be described in more detail with reference to the following examples which should not be construed to limit the scope of the present invention thereto.

The stress of a base film in MD and TD under a 200% elongation at 80° C. was measured by the method described above.

Production Examples 1-3

A glycol-modified polyethylene terephthalate was prepared by the copolymerization of terephthalic acid (dicarboxylic acid component) with ethylene glycol and 1,4-cyclohexanedimethanol (glycol component). By varying the comonomer ratio and the draw ratio, three kinds of Films a, b and c each having a stress within the range of 9.4 to 19.5 N/cm² under a 200% elongation at 80° C. were obtained.

Comparative Production Examples 1-3

A carboxylic acid-modified polyethylene terephthalate was prepared by the copolymerization of terephthalic acid and isophthalic acid (dicarboxylic acid component) with ethylene glycol (glycol component). By varying the comonomer ratio and the draw ratio, three kinds of Films d, e and f each having a stress in TD and MD as shown in Table 1 under a 200% elongation at 80° C. were obtained.

TABLE 1

| | | Stress at 200% elongation (N/cm²) | |
|---|---|---|---|
| | Films | MD | TD |
| Production Examples | | | |
| 1 | a | 14.6 | 9.4 |
| 2 | b | 19.5 | 10.7 |
| 3 | c | 18.9 | 14.1 |
| Comparative Production Examples | | | |
| 1 | d | 23.2 | 24.8 |
| 2 | e | 14.7 | broken |
| 3 | f | broken | broken |

Examples 1-3 and Comparative Examples 1-3

(1) Preparation of Decorative Sheet

Each decorative sheet having the structure as shown in FIG. 1 was produced while forming the base film from each of the drawn Films a to f having a thickness of 50 µm prepared in Production Examples 1-3 and Comparative Production Examples 1-3.

A release layer having a thickness of about 0.2 µm was formed from polyethylene wax on one of the surfaces of the base film, on which a transfer layer was further formed. As the transfer layer, a peel layer having a thickness of 7 µm was first formed by applying and drying a coating solution containing an acrylic resin.

Then, patterns of wood appearance were printed on the peel layer by a gravure rotary printing method using a gravure ink, to form a decorative layer (patterned ink layer). The ink used was prepared by adding a pigment composed of red oxide, chrome yellow and carbon black to an acrylic resin binder. On the decorative layer, a coating solution containing an acrylic resin and a vinyl chloride-vinyl acetate copolymer in a ratio of 1:1 by mass was applied and dried, to form an adhesive layer having a thickness of 10 µm, thereby finally obtaining each decorative sheet.

(2) Production of Decorated Resin Molding

Figure 5:
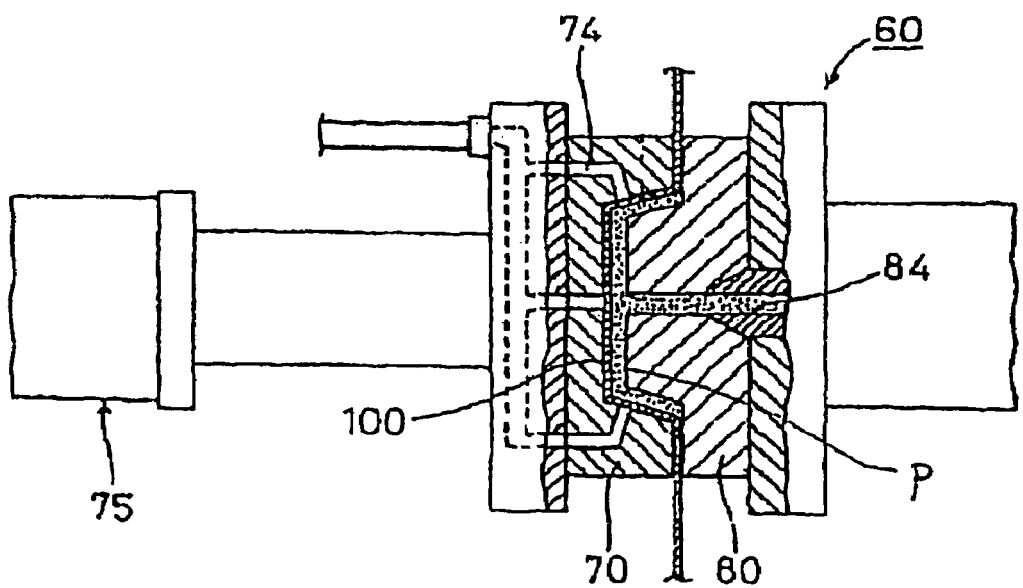
FIG. 5 illustrates a part of the molding steps in an example of the decorating injection molding method.

By the decorating injection molding method using each decorative sheet prepared in the step 1 and an ABS resin ("Kralastic MTH-2" (tradename) manufactured by Nippon A & L Inc.) as a resin molding compound, each decorated resin molding of laminate type was produced in accordance with the molding method illustrated in FIGS. 4 and 5. The conditions for the preforming and the injection molding are shown below.

Figure 3:
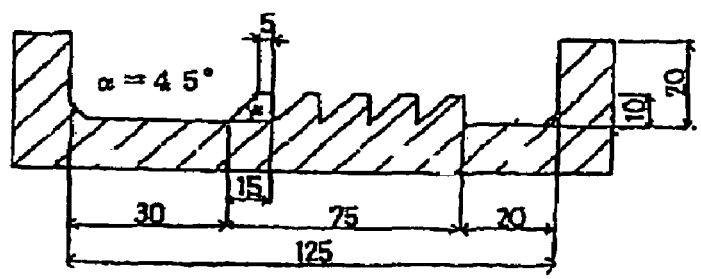
FIG. 3 is a cross-sectional view of the female mold used in examples and comparative examples.

In the production, a female mold having a corrugated mold surface as shown in FIG. 3 was used.

Conditions of Preforming
  Temperature of heating plate: 300° C.
  Distance between heating plate and film: 15 mm (non-contact radiant heating)
  Heating time: 5 s
  Temperature of decorative sheet: 70 to 80° C.
  Forming method: vacuum-pressure forming Conditions of Injection Molding
  Injected resin: ABS resin (mention above)
  Resin temperature: 230° C.

Mold temperature: 50° C.
Injection pressure: 140 MPa
Injection time: 3 s
Cooling time: 20 s
Number of gates: 6

The laminated state of the decorative sheet on the decorated resin molding was visually observed to evaluate the moldability of the decorative sheet according to the following ratings. The results are shown in Table 2.

Ratings for Evaluation
A: observed no wrinkle, blister, peeling and rapture in decorative sheet
B: observed slight wrinkle and blister in decorative sheet
C: observed any of wrinkle, blister, peeling and rapture in decorative sheet to cause problems in practical use

TABLE 2

|  | Films | Moldability of decorative sheet |
|---|---|---|
| Examples |  |  |
| 1 | a | A |
| 2 | b | A |
| 3 | c | A |
| Comparative Examples |  |  |
| 1 | d | C |
| 2 | e | B to C |
| 3 | f | C |

As seen from the results, it would appear that the decorative sheet exhibits an excellent moldability when the base film of the decorative sheet meets the requirements of the present invention.

INDUSTRIAL APPLICABILITY

Since the decorative sheet of the present invention has a good moldability, it is suitable for the production of the decorated resin moldings by the decorating injection molding method. The decorated resin moldings produced by using the decorative sheet have a good quality and a wide range of applications such as interior materials for vehicles, housing materials for electric appliances and notions.

What is claimed is:

1. A decorative sheet comprising a base film made of a thermoplastic polyester resin and a decorative layer on the base film, the base film being not broken in both of MD (a flow direction of film-forming) and TD (a direction perpendicular to MD) and. having a stress of 20 N/cm$^2$ or less in any of MD and TD, each under a 200% elongation at 80° C.

2. The decorative sheet according to claim 1, wherein the thermoplastic polyester resin is a polyethylene terephthalate-based resin.

3. The decorative sheet according to claim 1, for use in the production of decorated resin moldings by a decorating injection molding method.

4. A decorated resin molding comprising a resin molding and the decorative sheet as defined in claim 1, which is united with the resin molding by lamination such that the decorative layer of the decorative sheet faces toward the resin molding.

5. A decorated resin molding comprising a resin molding and a decorative layer bonded to the resin molding, the decorative layer being formed from the decorative sheet as defined in claim 1 by removing the base film.

6. A method of producing a decorated resin molding, which comprises the following sequential steps:

(A) a step of preforming a decorative sheet by disposing the decorative sheet as defined in claim 1 so as to allow the base film of the decorative sheet to face toward a mold surface having a given shape in a movable mold, and then, softening the decorative sheet by heating while bringing the softened decorative sheet into close contact with the mold surface by vacuum suction from a side of the movable mold;

(B) a step of injection molding by clamping the movable mold holding the decorative sheet which is brought into contact with the mold surface and a stationary mold, injecting a fluidized resin molding compound to fill a cavity formed between the molds, and then solidifying the fluidized resin molding compound thus injected, thereby forming a resin molding united with the decorative sheet by lamination, and (C) a step of taking the resin molding laminated with the decorative sheet with its entire layers out of the molds after separating the movable mold from the stationary mold.

7. The method according to claim 6, wherein the movable mold and the stationary mold constitute matching male and female molds.

8. A method of producing a decorated resin molding, which comprises the following sequential steps:

(A) a step of preforming a decorative sheet by disposing the decorative sheet as defined in claim 1 so as to allow the base film of the decorative sheet to face toward a mold surface having a given shape in a movable mold, and then, softening the decorative sheet by heating while bringing the softened decorative sheet into close contact with the mold surface by vacuum suction from a side of the movable mold;

(B) a step of injection molding by clamping the movable mold holding the decorative sheet which is brought into contact with the mold surface and a stationary mold, injecting a fluidized resin molding compound to fill a cavity formed between the molds, and then solidifying the fluidized resin molding compound thus injected, thereby forming a resin molding united with the decorative sheet by lamination, and (C') a step of separating the movable mold from the stationary mold, and taking the resin molding laminated with the decorative sheet out of the molds while leaving the base film of the decorative sheet in the movable mold, or taking the resin molding laminated with the decorative sheet with its entire layers and then peeling off the base film from the decorative sheet.

9. The method according to claim 8, wherein the movable mold and the stationary mold constitute matching male and female molds.

* * * * *